(12) United States Patent
Mickle et al.

(10) Patent No.: US 8,228,194 B2
(45) Date of Patent: Jul. 24, 2012

(54) RECHARGING APPARATUS

(75) Inventors: Marlin H. Mickle, Pittsburgh, PA (US);
Christopher C. Capelli, Kenosha, WI (US); Harold Swift, Gibsonia, PA (US)

(73) Assignee: University of Pittsburgh - Of the Commonwealth System of Higher Education, Pittsburgh, PA (US)

( * ) Notice: Subject to any disclaimer, the term of this patent is extended or adjusted under 35 U.S.C. 154(b) by 247 days.

(21) Appl. No.: 10/976,751

(22) Filed: Oct. 28, 2004

(65) Prior Publication Data

US 2006/0094425 A1    May 4, 2006

(51) Int. Cl.
*G08B 13/14* (2006.01)
(52) U.S. Cl. ............... 340/572.1; 340/572.4; 340/572.5; 340/538.14; 340/645
(58) Field of Classification Search .................. 343/741, 343/744, 703, 742, 895, 745, 757, 818, 701, 343/722, 850, 860, 866; 455/434, 123; 340/572.5, 340/572, 500, 505, 513, 572.1, 572.9, 825.69, 340/572.4, 645, 538.14
See application file for complete search history.

(56) References Cited

U.S. PATENT DOCUMENTS

| | | | | |
|---|---|---|---|---|
| 3,600,684 A | * | 8/1971 | Cherry | 455/193.3 |
| 3,613,008 A | * | 10/1971 | Jabbar | 455/250.1 |
| 3,696,368 A | * | 10/1972 | Kauffman | 340/553 |
| 3,922,679 A | * | 11/1975 | Campbell | 343/703 |
| 4,114,151 A | | 9/1978 | Denne et al. | |
| 4,531,117 A | * | 7/1985 | Nourse et al. | 340/572.4 |
| 5,446,447 A | * | 8/1995 | Carney et al. | 340/572.4 |
| 5,469,180 A | * | 11/1995 | Wiggenhorn | 343/744 |
| 5,673,018 A | | 9/1997 | Lowe et al. | |
| 5,970,398 A | | 10/1999 | Tuttle | |
| 6,037,743 A | | 3/2000 | White et al. | |
| 6,127,799 A | * | 10/2000 | Krishnan | 320/104 |
| 6,140,924 A | * | 10/2000 | Chia et al. | 340/572.5 |
| 6,204,765 B1 | * | 3/2001 | Brady et al. | 340/572.1 |
| 6,463,039 B1 | * | 10/2002 | Ricci et al. | 370/277 |
| 6,480,110 B2 | * | 11/2002 | Lee et al. | 340/572.5 |

(Continued)

FOREIGN PATENT DOCUMENTS

JP    3034862    12/1996

(Continued)

OTHER PUBLICATIONS

"A 0.5-mW Passive Telemetry IC for Biomedical Applications", by Quiting Huang et al., IEEE Journal of Solid-State Circuits, vol. 33, No. 7, Jul. 1998.

(Continued)

*Primary Examiner* — Dieu H Duong
(74) *Attorney, Agent, or Firm* — Eckert Seamans Cherin & Mellott, LLC; Philip E. Levy

(57) ABSTRACT

An energy harvesting circuit has an active automatic tuning circuit to search for broadcast frequencies in a band of interest and selecting only those broadcast signals received with sufficient RF strength to be used in energy harvesting. This circuit would provide power storage devices with a circuit that has a means to select the ambient RF that can maximize or enhance the performance of an RFID circuit by increasing the amount of energy for harvesting. This automatic tuning would enable a power storage devices charger circuit to move from location to location without manual tuning of the circuit and increase the effective range of an RFID circuit.

20 Claims, 3 Drawing Sheets

U.S. PATENT DOCUMENTS

| | | | |
|---|---|---|---|
| 6,545,570 B2 * | 4/2003 | Kawai | 333/216 |
| 6,614,403 B1 * | 9/2003 | Merenda | 343/741 |
| 6,650,227 B1 * | 11/2003 | Bradin | 340/10.3 |
| 6,664,770 B1 * | 12/2003 | Bartels | 323/222 |
| 6,677,852 B1 * | 1/2004 | Landt | 340/10.1 |
| 6,697,030 B2 * | 2/2004 | Gleener | 343/860 |
| 6,803,818 B2 * | 10/2004 | van Amerom | 330/144 |
| 6,841,981 B2 * | 1/2005 | Smith et al. | 323/312 |
| 6,856,291 B2 * | 2/2005 | Mickle et al. | 343/701 |
| 6,879,809 B1 * | 4/2005 | Vega et al. | 455/41.1 |
| 6,963,317 B2 * | 11/2005 | Zuk et al. | 343/895 |
| 7,023,342 B2 * | 4/2006 | Corbett et al. | 340/572.1 |
| 7,081,693 B2 * | 7/2006 | Hamel et al. | 307/151 |
| 7,084,605 B2 * | 8/2006 | Mickle et al. | 320/101 |
| 7,093,765 B2 * | 8/2006 | Baldischweiler et al. | 235/492 |
| 7,132,946 B2 * | 11/2006 | Waldner et al. | 340/572.1 |
| 7,142,114 B2 * | 11/2006 | Crowley | 340/572.1 |
| 7,167,090 B1 * | 1/2007 | Mandal et al. | 340/538.14 |
| 7,256,505 B2 * | 8/2007 | Arms et al. | 290/1 R |
| 7,408,456 B2 * | 8/2008 | Whitesmith et al. | 340/500 |
| 2003/0181229 A1 * | 9/2003 | Forster et al. | 455/575.7 |
| 2005/0017602 A1 * | 1/2005 | Arms et al. | 310/339 |

FOREIGN PATENT DOCUMENTS

| | | |
|---|---|---|
| JP | H10-257697 | 9/1998 |
| JP | 10-295043 | 11/1998 |

OTHER PUBLICATIONS

"A Broadband Rectenna Array for RF Energy Recycling", by Florian B. Helmbrecht, University of Colorado at Boulder, submitted to the Technische Universitat Munchen, Sep. 2002.

"A High Conversion Efficiency 5.8 GHz Rectenna", by James O. McSpadden et al., 1997 MTT-S Digest.

"ASIC-Based Batteryless Implantable Telemetry Microsystem for Recording Purposes", by J. Parramon et al., Proceedings—19th International Conference—IEEE/EMBS Oct. 30-Nov. 2, 1997 Chicago, IL. USA.

A Wireless Implantable Multichannel Digital Neural Recording System for a Micromachined Sieve Electrode, by Tayfun Akin et al., IEEE Journal of Solid-State Circuits, vol. 33, No. 1, Jan. 1998.

"Energy Harvesting, Profiles, and Potential Sources", by Marlin Mickle et al, International Journal of Parallel and Distributed Systems and Networks, vol. 4, No. 3, 2001.

"Planar Rectennas for 2.45GHz Wireless Power Transfer", by Jouko Heikkinen et al., Tamrpere University of Technology, 0-7803-6267-5/00/$10.00 © IEEE.

"Wireless Telemetry for Gas-Turbine Applications", by Russell G. DeAnna, U.S. Army Research Laboratory, Glenn Research Center, Cleveland, Ohio, Mar. 2000, NASA/TM-2000-209815, ARL-MR-474.

* cited by examiner

RECHARGING APPARATUS

BACKGROUND OF THE INVENTION

1. Field of the Invention

Many radio receivers provide users with a convenience feature for automatically searching for broadcast frequencies in a band of interest and selecting only those broadcast signals received with sufficient quality to be considered "listenable" for sustained audio output. This feature, known as search tuning in a "seek", or "scan" (with a truncated period of sustained audio output) operating mode is typically engaged by pressing a button, which then causes the tuner to automatically advance to the next frequency on which a station may broadcast, and evaluate whether a "listenable" broadcast is being received. If so, the tuner remains on that frequency. Otherwise, the tuner advances to the next available frequency.

2. Description of the Prior Art

For example, U.S. Pat. No. 5,613,230 discloses an AM radio receiver which includes search tuning such as seek or scan tuning features whose stop thresholds for locking onto a received frequency are adapted to environmental conditions. In the preferred embodiment, wideband signal strength, preferably derived from the automatic gain control of the radio frequency amplifier, provides a representative signal to the microprocessor for adapting the thresholds used during search tuning. The thresholds are increased when significant energy is present in the AM band and proportioned to the level of that energy. The decision logic of the microprocessor adapts thresholds according to the tuned signal strength, to wideband signal strength, to nighttime operation during which ionosphere conditions increase transmissibility of distant radio signals, and to intermediate frequency (IF) count validity to reduce the probability of stopping on audibly noisy frequencies when the RF signal environment is noisy.

Energy Harvesting

The harvesting of Radio Frequency (RF) energy is extremely important for Radio Frequency Identification (RFID), security monitoring and remote sensing as well as other uses. Some harvesting devices may be tuned to a specific frequency (RFID), while others take advantage of the ambient energy (remote sensing) and others simply sense frequencies for security purposes.

Recharging devices using an RF electromagnetic field radiated into free space have been described. U.S. Pat. No. 6,127,799 describes a charge storage device that is charged by exposing the charge storage device to an RF electromagnetic field radiated into free space. The charge storage device includes one or more antennas disposed on the device and adapted to receive the radiated RF electromagnetic field. One or more rectifiers are connected to the antennas for rectifying the received RF electromagnetic field into a DC output current. The DC output current produced by the rectifier is used to energize the charge storage device.

As disclosed in U.S. Pat. No. 6,127,799, the antennas may be one or more dipole antennas which are combined to form at least two subsets of dipole antenna element arrays, wherein one subset may be oriented at an acute or a right angle with respect to at least one other subset. The antennas or dipole antennas may be placed on more than one outside surface of the charge storage device which enclose an acute or a right angle with respect to each other. The antennas in the energy harvesting circuit of U.S. Pat. No. 6,127,799 are designed for a specific frequency.

U.S. patent application Ser. No. 10/624,051 by Mickle et al entitled, "Energy Harvesting Circuits and Associated Methods" discloses an energy harvesting circuit that has an inherently tuned antenna, with at least portions of the energy harvesting circuit structured to provide regenerative feedback into the antenna to thereby establish an effective antenna area substantially greater than the physical area A major problem with the prior art is that the energy harvesting circuits cannot efficiently harvest RF energy at frequencies outside the design specific frequency of the antenna.

There is a need for energy harvesting circuits that can harvest RF energy from a broad RF spectrum.

Furthermore, there is a need for energy harvesting circuits that can harvest RF energy from a broad RF spectrum by having the ability to be tuned to broadcast frequencies (or other ambient frequencies) in a band of interest and select the broadcast signal that maximizes the RF energy.

Also, there is a need for small remote power charger device that has a means for receipt of transmitted energy from the environment and energizing power storage devices on an object of interest wherein the power charger device automatically searches for broadcast frequencies in a band of interest and selects the broadcast signal that maximizes the RF energy.

SUMMARY OF THE INVENTION

The present invention has met the above-described needs.

In one embodiment of the invention, an energy harvesting circuit has an active automatic tuning circuit to automatically search for broadcast frequencies in a band-of interest and selecting only those broadcast signals received with sufficient RF strength to be used in energy harvesting. This energy harvesting circuit would provide mobile power storage devices with a means to select the ambient RF that can provide the maximum amount of energy for harvesting. This automatic tuning would enable a device with power storage devices to move from location to location without manual tuning of the circuit.

The circuit may be formed as a stand-alone unit and, in another embodiment, may be formed on an integrated circuit.

The circuit may include a single broadband antenna that can be tuned using the active automatic tuning circuit selecting the ambient RF that can provide the maximum amount of energy for harvesting.

The circuit may include a multiple antenna wherein each antenna is designed for a selected RF spectrum. The active automatic tuning circuit of the energy harvesting circuit would select and tune said antenna or antennas so as to receive select ambient RF that can provide the maximum amount of energy for harvesting.

The circuit may be formed as a stand-alone unit and, in another embodiment, may be formed on an integrated circuit chip.

The antenna(s) may take the form of a conductive coil, patch or other type on a planar substrate or may be a stand-alone component.

The invention will be more fully understood from the following description of the invention with reference to the drawings appended hereto.

DESCRIPTION OF THE PREFERRED EMBODIMENTS

Figure 1:
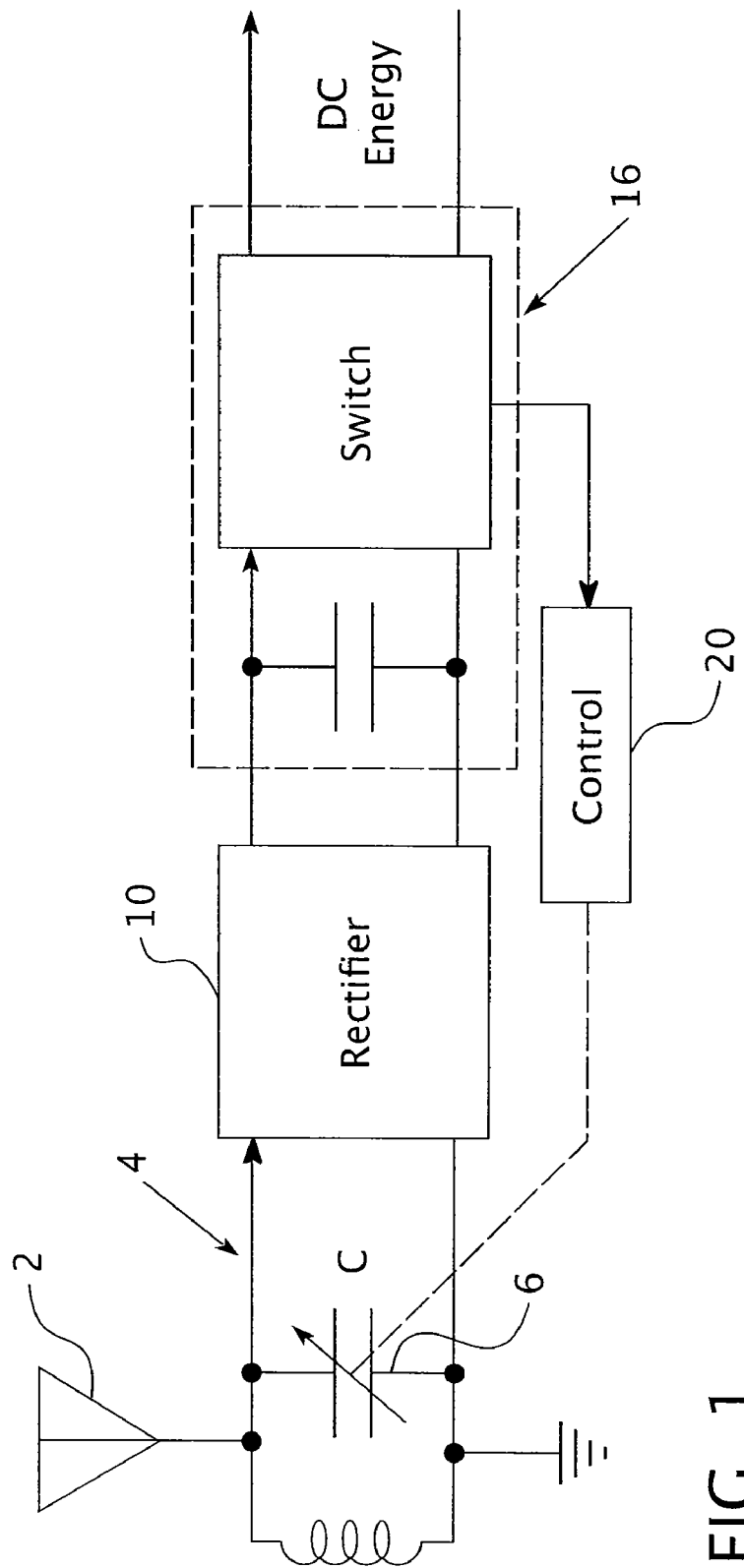
FIG. 1 is a schematic illustration of one embodiment of energy harvesting circuit of the present invention that includes a tuning/control system for energy harvesting.

In one embodiment of the invention, an energy harvesting circuit has an active automatic tuning circuit to automatically search for broadcast frequencies in a band of interest and selecting only those broadcast signals received with sufficient RF strength to be used in energy harvesting. This energy harvesting circuit would provide a mobile battery charger with a means to select the ambient RF signal. or combination of signals that can provide the maximum amount of energy for harvesting. This automatic tuning would enable a device with a battery charger circuit to move from location to location without manual tuning of or intervention in the circuit.

The circuit may be formed as a stand-alone unit and, in another embodiment, may be formed on an integrated circuit. The circuit may include a single broadband antenna that can be tuned using the active automatic tuning circuit selecting the ambient RF that can provide the maximum amount of energy for harvesting. Additionally, the circuit may include multiple antennas wherein each antenna is designed for a selected RF spectrum.

The active automatic tuning circuit of the energy harvesting circuit would select and tune said antenna or antennas and/or tune the associated circuitry so as to receive select ambient RF that can provide the maximum amount of energy for harvesting. Furthermore, the circuit may be formed as a stand-alone unit and, in another embodiment, may be formed on an integrated circuit chip. The antenna(s) may take the form of a conductive coil, patch, or on a planar substrate, or may be a stand-alone component.

The harvesting of Radio Frequency (RF) energy is, for example, important for Radio Frequency Identification (RFID), security monitoring and remote sensing. Some harvesting devices may be tuned to a specific frequency (RFID), while others may take advantage of the ambient energy (remote sensing) and others simply sense frequencies for security purposes.

The initial area addressed herein is the class of devices that harvest available ambient RF energy. Such devices typically have a broadband antenna covering a part of the total RF band of interest. The most favorable energy sources will vary from location to location such as local AM, FM, TV, WiFi, and from time to time, e.g., FCC regulations before and after sundown.

Therefore, it is desirable to have a tuning mechanism as a part of the harvesting antenna and/or tuner combination to adapt to the most favorable portion of the RF band of interest. While classical communications receivers select single narrow frequency bands to discriminate from other noise or adjacent bands for the sake of clarity, the situation with energy harvesting is somewhat different. The sole function of tuning is to achieve more energy no matter how the incident RF frequencies may be combined, or overlapped.

The class of devices being considered includes devices that use batteries or other power storage means such as cell phone, watches, PDAs, for example. Additionally, the class of devices being considered includes remote and unattended devices which may include an automatic mechanism for tuning and adjusting the harvesting antenna/tuner combination while requiring a minimum amount of energy for the tuner operation. As a result, the usable amount of harvested energy is to be reduced by the amount required to operate the tuner thereby providing a very efficient device. Currently, this would suggest that a 24 hour requirement on the order of pica or nano joules would be sufficient for the tuner operation.

The embodiment disclosed herein may also be important in applications such as RFID wherein the spectrum is narrow. In such a narrow spectrum, even with a local RF source, the ambient (exogenous) conditions may alter this target frequency whereby the embodiment disclosed would prove to benefit the operation of the RFID device.

The basis of the automatic tuning system is the following:

(a) A feedback concept is employed using a fixed voltage upper limit as the control mechanism to measure the upper limit of time, T, required to obtain $z$,900 energy$(t)dt=K$ (b) Once the voltage level, K, is reached, the capacitor is discharged onto a general storage unit.

(c) Multiple generator units may be connected in series to provide a higher resulting voltage.

(d) A boost circuit will be used where desired as a DC to DC voltage amplifier. The boost circuit may be (1) commercially available as a device, (2) licensed IP, e.g., U.S. Pat. No. 6,462,962, (3) a generic circuit, or (4) a new circuit.

One embodiment of a control system is given in FIG. 1. In FIG. 1, the system consists of a broadband antenna 2, a tuning (or matching) circuit 4, typically LC, with a variable capacitor 6 that can be realized in a number of different ways, a rectifier 10 which is likely a charge pump, a switch 16 that is activated by a specific voltage level that drains the intermediate storage capacitor, and a control circuit 20.

The control circuit 20 consists of an oscillator and counter where the counter has a buffer to store count i to be compared with count i+1. Thus, the following conditions can occur:

$$\text{Count } i < \text{Count } i+1, \text{ where state } i \text{ is preferred to state } i+1 \quad (1$$

$$\text{Count } i > \text{Count } i+1, \text{ where state } i+1 \text{ is preferred to state } i \quad (2)$$

$$\text{Count } i = \text{Count } i+1, \text{ which implies no action} \quad (3)$$

It may also be desirable to extend the single measurement to a window of time say i-k, i-k+1, . . . i and i+1, i+2, . . . i+k whereby an average would be obtained to reduce unnecessary "hunting" of the circuit.

Figure 2:
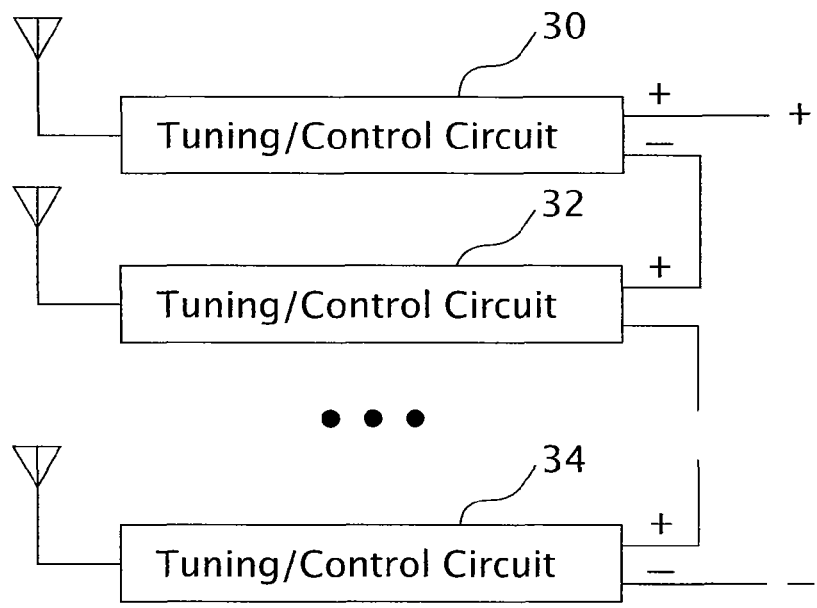
FIG. 2 is a schematic illustration of an embodiment of energy harvesting circuit showing a series connection of the circuit to obtain increased voltage.

The system of FIG. 1 may be connected as multiple systems 30,32,34 as shown in FIG. 2 in order to achieve a higher voltage.

The switch of FIG. 1 is a member of a class of solid state switches available in a wide variety of voltages.

The variable capacitor, C, of FIG. 1 can be implemented in a variety of ways including (1) using transistors as capacitors, (2) using multiple external discrete capacitors with solid state switches, and (3) using capacitors fabricated on the same chip to be included or excluded in the circuit by using switching transistors.

Figure 3:
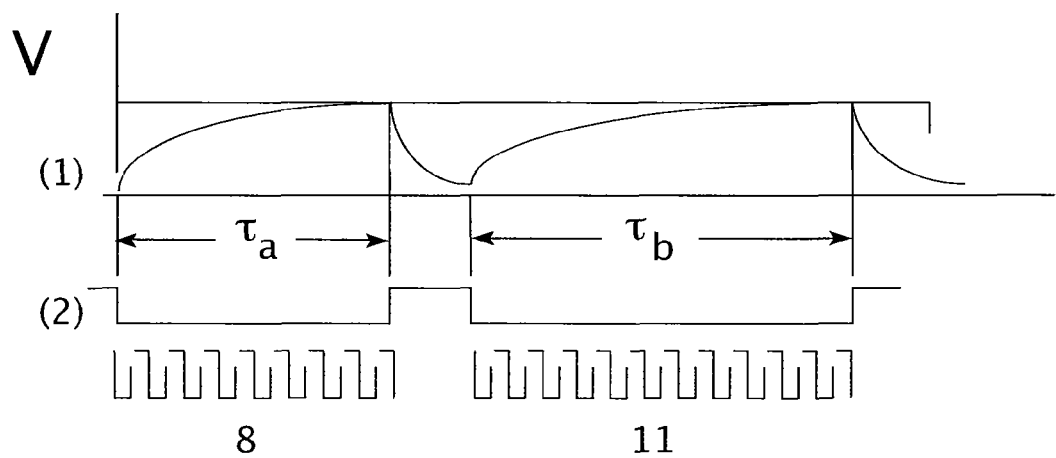
FIG. 3 is a schematic illustration of timing intervals for two different energy accumulation rates.

The ambient energy will vary giving a rate of change of accumulated energy as shown in FIG. 3. The time to reach a certain voltage where joules=½ $(C*V^2)$ will vary depending on the energy available during a specific period of time, say $T_i$. FIG. 3 is an illustration of two different periods of time, $T_a$ and $T_b$, that are required to accumulate the same amount of energy, ½ $(C*V^2)$.

By counting the intervals between pulses for a fixed value of V, it is therefore possible to differentiate two conditions of accumulated energy. In FIG. 3, case a, $T_a$ is better (8 pulses) than case b, $T_b$ (11 pulses) because it takes less time to reach the value of energy, ½ $(C*v^2)$.

Figure 4:
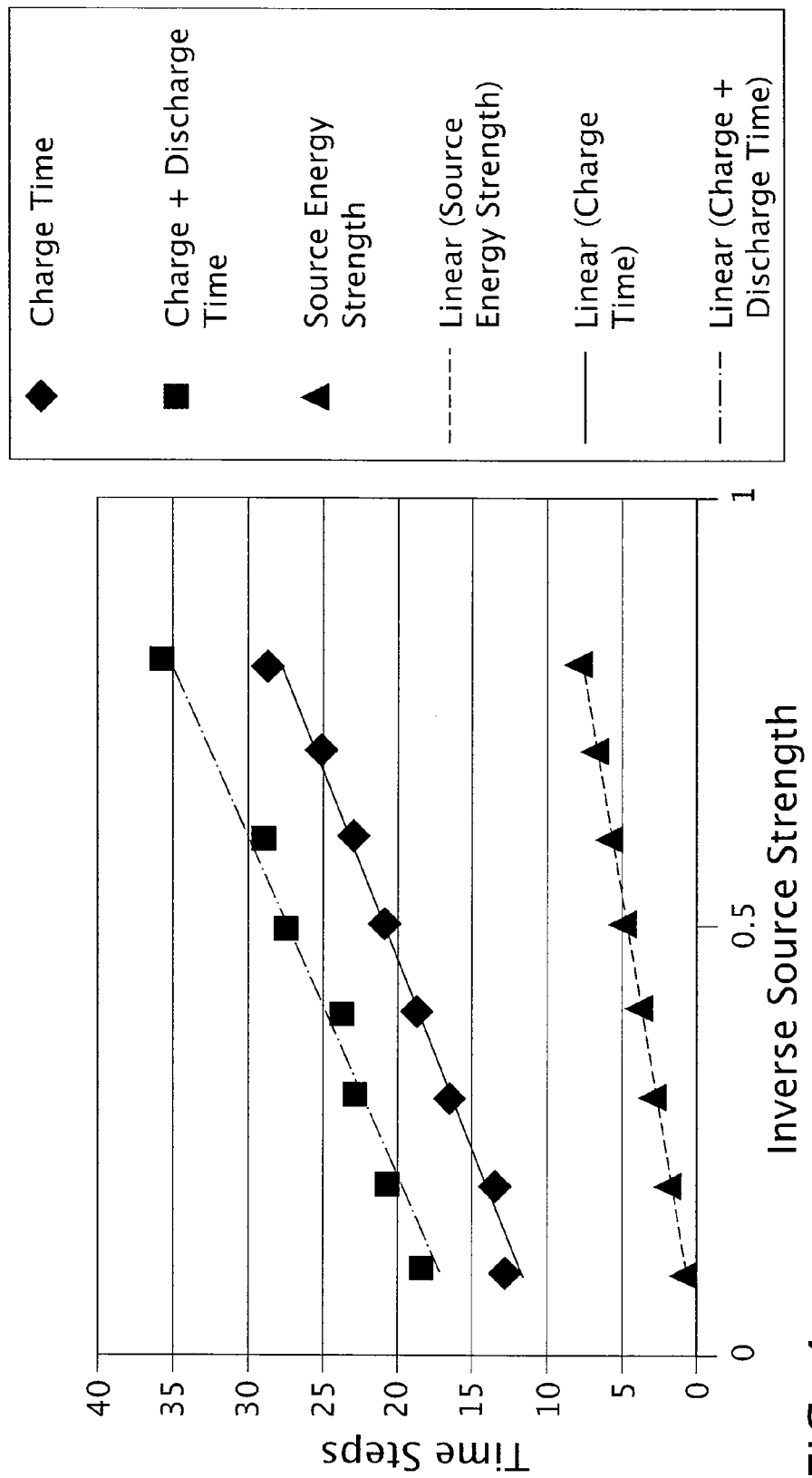
FIG. 4 is a graph illustrating the parameters of feedback signals for maximizing energy harvesting.

FIG. 4 illustrates the situation where an ambient voltage source is held constant and the capacitor is switched to show the effect on the charging time to reach the voltage ½ ($C*V^2$).

Whereas particular embodiments have been described herein for purposes of illustration, it will be appreciated by those skilled in the art that numerous variations of the details may be made without departing from the invention as defined in the appended claims.

We claim:

1. A remote station for receipt of ambient energy from the environment and energizing energy storage devices of objects of interest comprising:
  at least one antenna;
  circuitry for converting said ambient energy into DC energy for energizing said energy storage devices;
  circuitry for automatic search tuning to tune said antenna; and
  means for measuring the voltage of said DC energy to determine the energy harvesting effectiveness of said remote station;
  wherein the means for measuring is configured to measure a first parameter associated with the DC energy and a first tuning frequency and a second parameter associated with the DC energy and a second tuning frequency, and wherein the circuitry for automatic search tuning is configured to tune the antenna to the first tuning frequency based on the first parameter and the second parameter.

2. The remote station of claim 1 wherein the ambient energy is RF energy.

3. The remote station of claim 1 wherein the first tuning frequency provides generally the maximum RF ambient energy that can be harvested for a specific location.

4. A remote station, comprising:
  at least one antenna; and
  circuitry configured to automatic search tune said antenna, said circuitry having a control system that includes a tuning circuit operatively coupled to said at least one antenna, a rectifier operatively coupled to said at least one antenna and configured to receive RF energy from said antenna and convert said RF energy to DC energy, a storage unit operatively coupled to said rectifier and configured to receive said DC energy output by said rectifier, and a switch operatively coupled to said storage unit, said switch being activated when energy stored by said storage unit reaches a specific voltage level to discharge said storage unit;
  wherein the circuitry is configured to measure a first parameter associated with the DC energy and a first tuning frequency and a second parameter associated with the DC energy and a second tuning frequency, and wherein said tuning circuit is configured to tune the at least one antenna to the first tuning frequency based on the first parameter and the second parameter.

5. The remote station of claim 4 wherein said rectifier is a charge pump.

6. The remote station of claim 4 wherein said tuning circuit includes an LC circuit with a variable capacitor.

7. The remote station of claim 4 wherein said control system has a control circuit that is structured to determine a time for said energy stored by said storage unit to reach a specific voltage level.

8. A remote station for receipt of ambient energy from the environment and energizing energy storage devices of objects of interest comprising:
  at least one antenna;
  conversion circuitry for converting said ambient energy into DC energy for energizing said energy storage devices; and
  circuitry for automatic search tuning to tune said conversion circuitry; and
  means for measuring the voltage of said DC energy to determine the energy harvesting effectiveness of said remote station;
  wherein the means for measuring is configured to measure a first parameter associated with the DC energy and a first tuning frequency and a second parameter associated with the DC energy and a second tuning frequency, and wherein the circuitry for automatic search tuning is configured to tune the conversion circuitry to the first tuning frequency based on the first parameter and the second parameter.

9. A remote station for receipt of local energy for an RFID implementation from the environment and energizing energy storage devices of objects of interest comprising:
  at least one antenna;
  circuitry for converting said local energy into DC energy for energizing said energy storage devices;
  circuitry for automatic search tuning to tune said antenna; and
  means for measuring the voltage of said DC energy to determine the energy harvesting effectiveness of said RFID implementation;
  wherein the means for measuring is configured to measure a first parameter associated with the DC energy and a first tuning frequency and a second parameter associated with the DC energy and a second tuning frequency, and wherein the circuitry for automatic search tuning is configured to tune the antenna to the first tuning frequency ased on the first parameter and the second parameter.

10. The remote station of claim 9 wherein the first tuning frequency provides generally the maximum RF ambient energy that can be harvested for a specific location.

11. A remote station for receipt of local energy for an RFID device from the environment and energizing energy storage devices of objects of interest comprising:
  at least one antenna;
  circuitry for converting said local energy into DC energy for energizing said power storage devices;
  circuitry for automatic search tuning to tune said antenna; and
  means for measuring the voltage of said DC energy to determine the energy harvesting effectiveness of said remote station;
  wherein the means for measuring is configured to measure a first parameter associated with the DC energy and a first tuning frequency and a second parameter associated with the DC energy and a second tuning frequency, and wherein the circuitry for automatic search tuning is configured to tune the antenna to the first tuning frequency based on the first parameter and the second parameter.

12. The remote station of claim 11 wherein the first tuning frequency provides generally the maximum RF ambient energy that can be harvested for a specific location.

13. A remote station for receipt of ambient energy from the environment comprising:
  at least one antenna;
  circuitry for converting said ambient energy into DC energy;

circuitry for automatic search tuning to tune said antenna; and means for measuring the voltage of said DC energy to determine the energy harvesting effectiveness of said remote station;

wherein the means for measuring is configured to measure a first parameter associated with the DC energy and a first tuning frequency and a second parameter associated with the DC energy and a second tuning frequency, and wherein the circuitry for automatic search tuning is configured to tune the antenna to the first tuning frequency based on the first parameter and the second parameter.

14. The remote station of claim 13 wherein the first tuning frequency provides generally the maximum RF ambient energy that can be harvested for a specific location.

15. A method for energizing energy storage devices of objects of interest comprising the steps of:

receiving ambient energy from the environment at a remote station using at least one antenna;

converting with energy converting circuitry said ambient energy into DC energy;

automatically search tuning said at least one antenna using tuning circuitry; and measuring the voltage of said DC energy to determine the energy harvesting effectiveness of said remote station, including measuring a first parameter associated with the DC energy and a first tuning frequency and a second parameter associated with the DC energy and a second tuning frequency wherein the automatically search tuning comprises tuning the at least one antenna to the first tuning frequency based on the first parameter and the second parameter.

16. The method of claim 15, wherein the first tuning frequency provides generally the maximum RF ambient energy that can be harvested for a specific location.

17. An apparatus, comprising:
an antenna;
a tunable circuit coupled to the antenna;
conversion circuitry configured to convert harvested energy into DC energy; and
tuning circuitry configured to measure a parameter associated with the DC energy and a first tuning frequency, and a parameter associated with the DC energy and a second tuning frequency,
the tuning circuitry configured to tune the tunable circuit to the first tuning frequency based on the parameter associated with the DC energy of the first tuning frequency and the parameter associated with the DC energy of the second tuning frequency.

18. The apparatus of claim 17, wherein the parameter associated with the DC energy and the first tuning frequency is a time interval for the DC energy of the first tuning frequency to produce a predetermined DC voltage.

19. A method, comprising:
receiving measurement information associated with a DC energy and a first harvesting frequency and measurement information associated with a DC energy and a second harvesting frequency; and
tuning a tunable circuit coupled to an antenna in an energy harvester to the first harvesting frequency based on the measurement information associated with the DC energy of the first harvesting frequency and the measurement information associated with the DC energy of the second harvesting frequency.

20. The method of claim 19, wherein the measurement information associated with a DC energy and the first harvesting frequency includes a time interval for the DC energy of the first harvesting frequency to produce a predetermined DC voltage.

* * * * *

UNITED STATES PATENT AND TRADEMARK OFFICE
CERTIFICATE OF CORRECTION

PATENT NO. : 8,228,194 B2
APPLICATION NO. : 10/976751
DATED : July 24, 2012
INVENTOR(S) : Mickle et al.

It is certified that error appears in the above-identified patent and that said Letters Patent is hereby corrected as shown below:

On the Title Page:

Title page, item (56), first column, U.S. PATENT DOCUMENT, add --4,177,465 A * 12/1979 Lundvall....343/741--.
Second page, item (56), second column, OTHER PUBLICATIONS, lines 4 and 5, "James 0. McSpadden et al." should read --James O. McSpadden et al.--.
Second page, item (56), second column, OTHER PUBLICATIONS, line 10, "A Wireless" should read --"A Wireless--.
Second page, item (56), second column, OTHER PUBLICATIONS, line 11, "Electrode," should read --Electrode,"--.

In the Specification:

Column 2, line 4, "area" should read --area.--.
Column 3, line 15, "signal. or" should read --signal, or--.
Column 4, line 14, "z.900 energy(t)dt = K" should read -- $_0\int^{\tau} energy(t)dt = K$. --.
Column 4, line 35, "(1" should read --(1)--.

In the Claims:

Column 6, line 7, "devices; and" should read --devices;--.
Column 6, line 38, "ased" should read --based--.
Column 7, line 29, "frequency wherein" should read --frequency, wherein--.

Signed and Sealed this
Eighteenth Day of June, 2013

Teresa Stanek Rea
*Acting Director of the United States Patent and Trademark Office*